United States Patent Office.

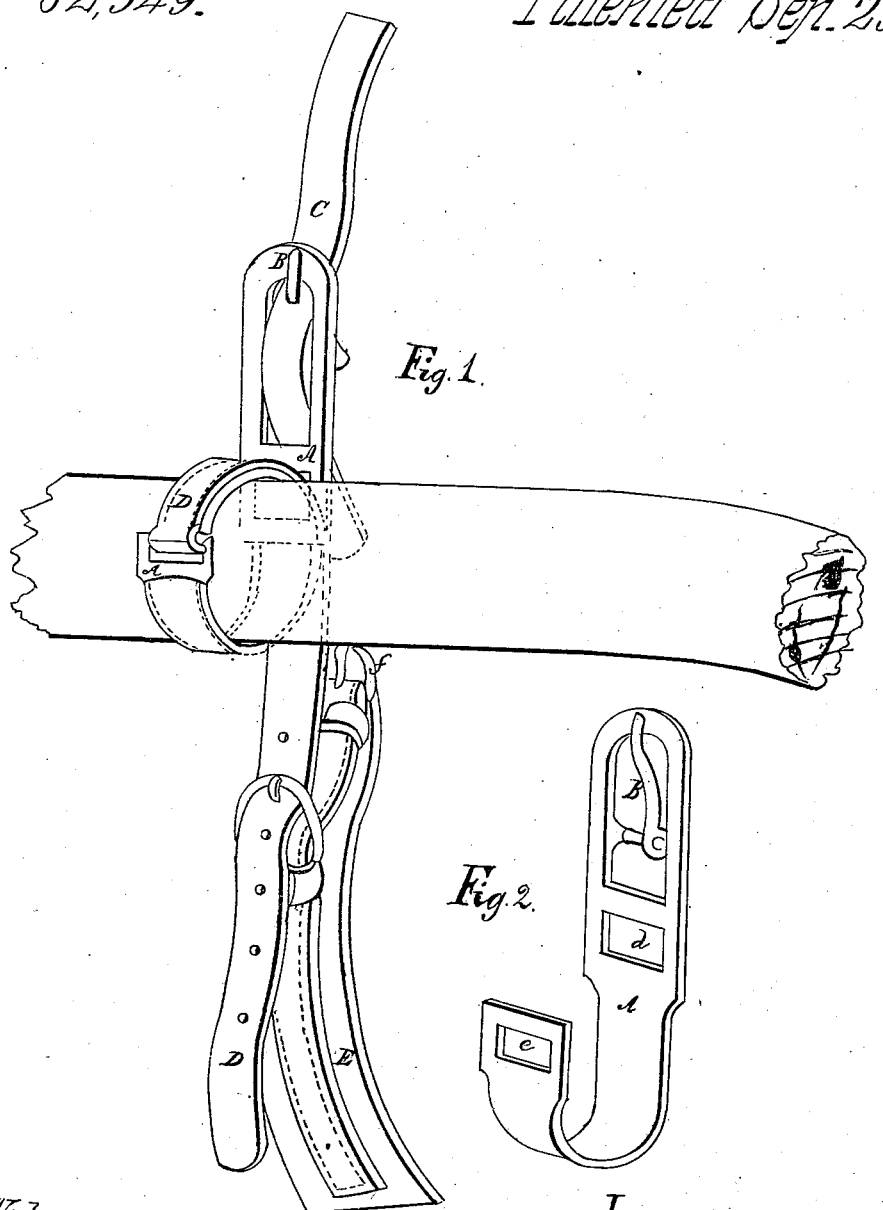

WILLIAM PLATT, OF BALTIMORE, MARYLAND.

Letters Patent No. 82,549, dated September 29, 1868.

IMPROVED SHAFT-BEARER.

The Schedule referred to in these Letters Patent and making part of the same.

TO ALL WHOM IT MAY CONCERN:

Be it known that I, WILLIAM PLATT, of the city of Baltimore, and State of Maryland, have invented a new and useful Improvement in Shaft-Bearers; and I do hereby declare the following to be a full, clear, and exact description thereof, reference being had to the accompanying drawings, which are made a part of this specification, and in which—

Figure 1 is a general view of the device in the ordinary working position.

Figure 2 is a view of the shaft-bearing hook, divested of the straps which accompany it when in use.

The hook is buckled to the "billet-strap" from the saddle, and receives the shaft, after which a strap is lapped over it and passed down inside the shaft to the belly-band. The shaft is readily dropped into the hook, without passing it in endways, as usual in the common "billet-loop," and the subsequent lap of the strap holds it in position.

In the drawings—

The metallic hook, A, has three openings. At the upper end it forms the frame of a buckle, and has a tooth, B, to secure the "billet-strap" C, which depends from the saddle. The middle opening $d$ is for receiving the end of the strap D, after it is lapped over the shaft and buckled to the belly-band E. The opening $e$ is for the attachment of the strap D.

The buckle $f$, at the upper part of the belly-band E, is for the "point-strap" proceeding from the pad, and by which the saddle is girthed to the horse.

The hook of the shaft-bearer is clothed with leather, to preserve the shaft from wear.

In hitching the horse in the shafts, the strap D, on each side of the animal, is yet unbuckled from the belly-band, and laid over outwardly, so that the shafts can be dropped into the hooks of the bearers, instead of entering them endways, which requires that the hostler shall go to each side of the horse before the shaft can be run into the loop sufficiently far to enable the tugs to be hitched. The present improvement renders unnecessary this trouble.

The straps D are passed over the respective shafts, and buckled to the belly-band, as shown in fig. 1.

Having described my invention, what I claim as new, and desire to secure by Letters Patent, is—

The shaft-bearer A, provided with a means of attachment to the "billet-strap," a hook for receiving the shaft, and a loop for the attachment of the securing-strap D, substantially as described and represented.

To the above specification of my invention, I have signed my hand, this 18th day of August, A. D. 1868.

WILLIAM PLATT.

Witnesses:
OCTAVIUS KNIGHT,
WM. H. BRERETON.